United States Patent
Kim et al.

(10) Patent No.: US 9,527,383 B2
(45) Date of Patent: Dec. 27, 2016

(54) PEDAL EFFORT ADJUSTING APPARATUS FOR VEHICLES

(71) Applicants: Hyundai Motor Company, Seoul (KR); Kyung Chang Industrial Co., Ltd., Daegu (KR)

(72) Inventors: Eun Sik Kim, Gwangmyeong-si (KR); Jong Hee Han, Waegwan-eup (KR)

(73) Assignees: Hyundai Motor Company, Seoul (KR); Kyung Chang Industrial Co., Ltd., Daegu (KR)

( * ) Notice: Subject to any disclaimer, the term of this patent is extended or adjusted under 35 U.S.C. 154(b) by 0 days.

(21) Appl. No.: 14/731,891

(22) Filed: Jun. 5, 2015

(65) Prior Publication Data

US 2016/0185215 A1 Jun. 30, 2016

(30) Foreign Application Priority Data

Dec. 24, 2014 (KR) .................. 10-2014-0188318

(51) Int. Cl.
*B60K 23/02* (2006.01)

(52) U.S. Cl.
CPC ........ *B60K 23/02* (2013.01); *B60Y 2400/4024* (2013.01)

(58) Field of Classification Search
CPC .............. G05G 7/04; G05G 5/03; G05G 1/30; G05G 1/44; F16D 23/12; B60K 23/02; B60T 7/04; Y10T 74/20528; Y10T 74/20888

See application file for complete search history.

(56) References Cited

U.S. PATENT DOCUMENTS

| | | | |
|---|---|---|---|
| 4,522,082 A | 6/1985 | Musumiya et al. | |
| 7,051,616 B2 | 5/2006 | Yokochi et al. | |
| 7,428,856 B2 * | 9/2008 | Podkopayev | G05G 1/30 74/512 |

FOREIGN PATENT DOCUMENTS

| | | | |
|---|---|---|---|
| DE | 10258938 A1 * | 7/2004 | ............ F16D 23/12 |
| JP | 2006-290082 A | 10/2006 | |
| KR | 10-1998-046623 A | 9/1998 | |
| KR | 10-0820241 B1 | 4/2008 | |
| KR | 10-2009-0074879 A | 7/2009 | |
| KR | 10-0926035 B1 | 11/2009 | |
| KR | 10-2014-0083333 A | 7/2014 | |

\* cited by examiner

*Primary Examiner* — Thomas Diaz
(74) *Attorney, Agent, or Firm* — Morgan, Lewis & Bockius LLP (57) ABSTRACT

A pedal effort adjusting apparatus for vehicles may include a fixed part rotatably coupled with a pedal member, a moving part configured to linearly move with respect to the fixed part, an elastic member configured to support the fixed part and the moving part, and a lever protrusion coupled to a hinge shaft of a pedal and configured to rotate together with the pedal and have an end rotatably coupled to the moving part to linearly move the moving part at a time of the rotation of the pedal.

7 Claims, 10 Drawing Sheets

PEDAL EFFORT ADJUSTING APPARATUS FOR VEHICLES

CROSS REFERENCE TO RELATED APPLICATION

The present application claims priority to Korean Patent Application No. 10-2014-0188318, filed Dec. 24, 2014, the entire contents of which is incorporated herein for all purposes by this reference.

BACKGROUND OF THE INVENTION

1. Field of the Invention

The present invention relates to a pedal effort reducing apparatus of a clutch pedal for vehicles, and more particularly, to a pedal effort adjusting apparatus for vehicles capable of being used even in high horse power vehicles having a high engine output while reducing a pedal effort which a driver feels during a pedal operation.

2. Description of Related Art

Generally, a passive transmission vehicle includes a clutch which is disposed between a flywheel and an input shaft of a transmission to control engine power delivered to a transmission as needed, in which the clutch has a structure which is operated by a clutch pedal.

A driver frequently operates the clutch pedal as well as an accelerator pedal and a brake pedal while a vehicle is driven. In particular, the driver continuously applies a pedal effort due to the operation of the clutch pedal while driving a long distance, and may feel tired.

Figure 1:
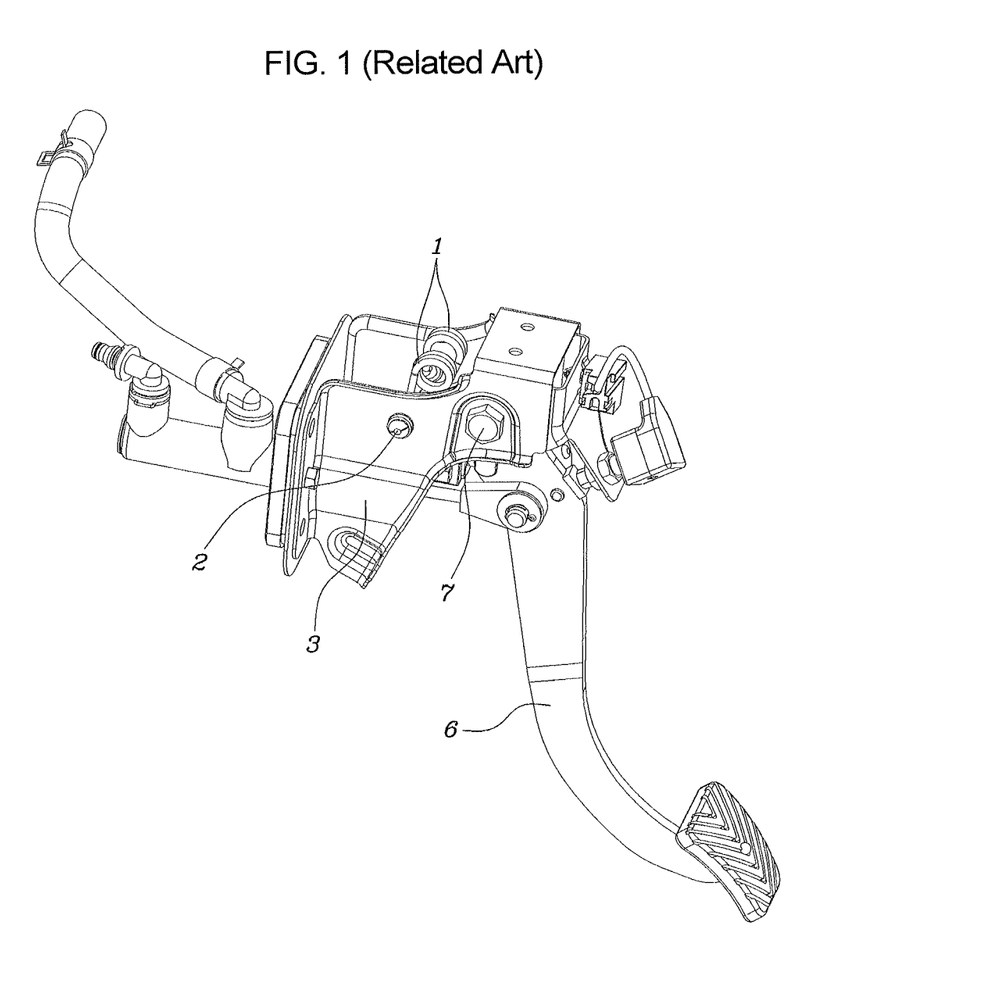
FIG. 1, FIG. 2A, FIG. 2B and FIG. 3 are diagrams for describing the existing clutch pedal apparatus including a turnover spring.
Figure 2A:
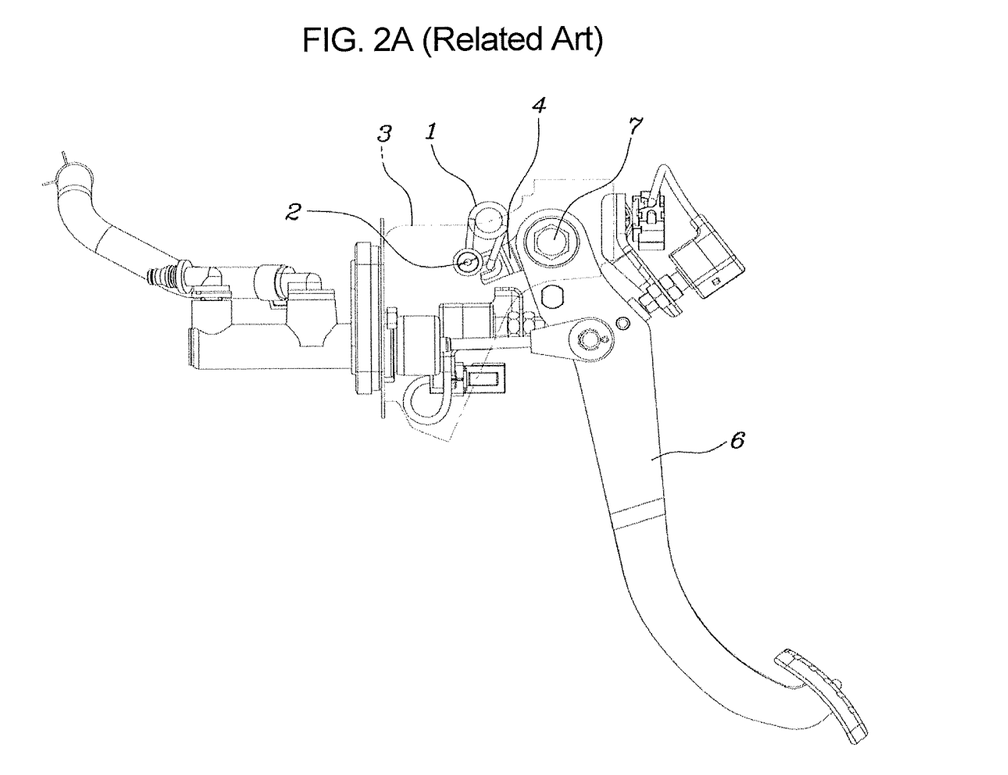
Figure 2B:
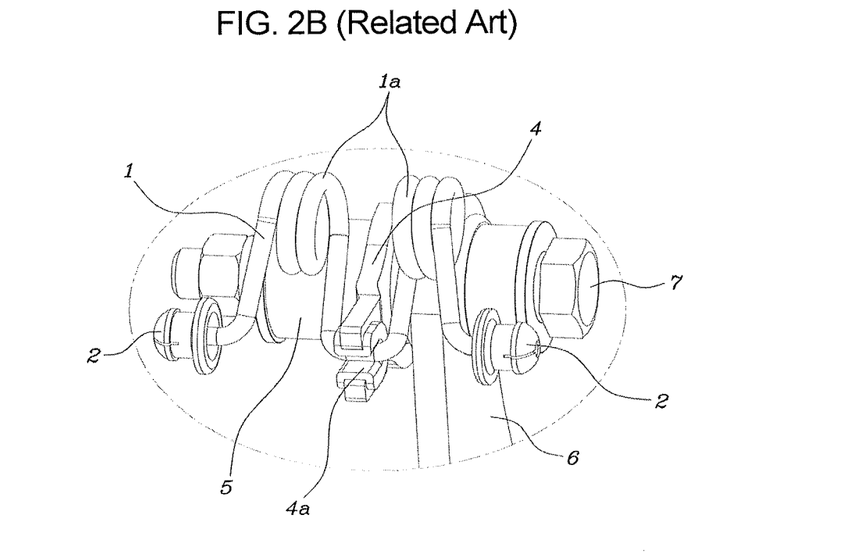

To supplement this problem, a clutch pedal apparatus using a turnover spring has been developed. As illustrated in FIG. 1, FIG. 2A and FIG. 2B, the turnover spring 1 includes two coil parts 1a wound in a coil shape, both ends of the turnover spring 1 are coupled with spring bushes 2, the spring bushes 2 penetrate through both side portions of the pedal member 3, respectively, a middle portion between the two coil parts 1a is fitted in a locking groove 4a of a spring bracket 4, and thus the turnover spring 1 is rotatably installed with respect to the pedal member 3.

Here, the spring bracket 4 is integrally coupled with a hinge shaft bush 5, in which the hinge shaft bush 5 is integrally coupled with the pedal 6 while penetrating through an upper end of the pedal 6 and the hinge shaft 7 is fastened with the pedal member 3 after penetrating through the hinge shaft bush 5.

Figure 3:
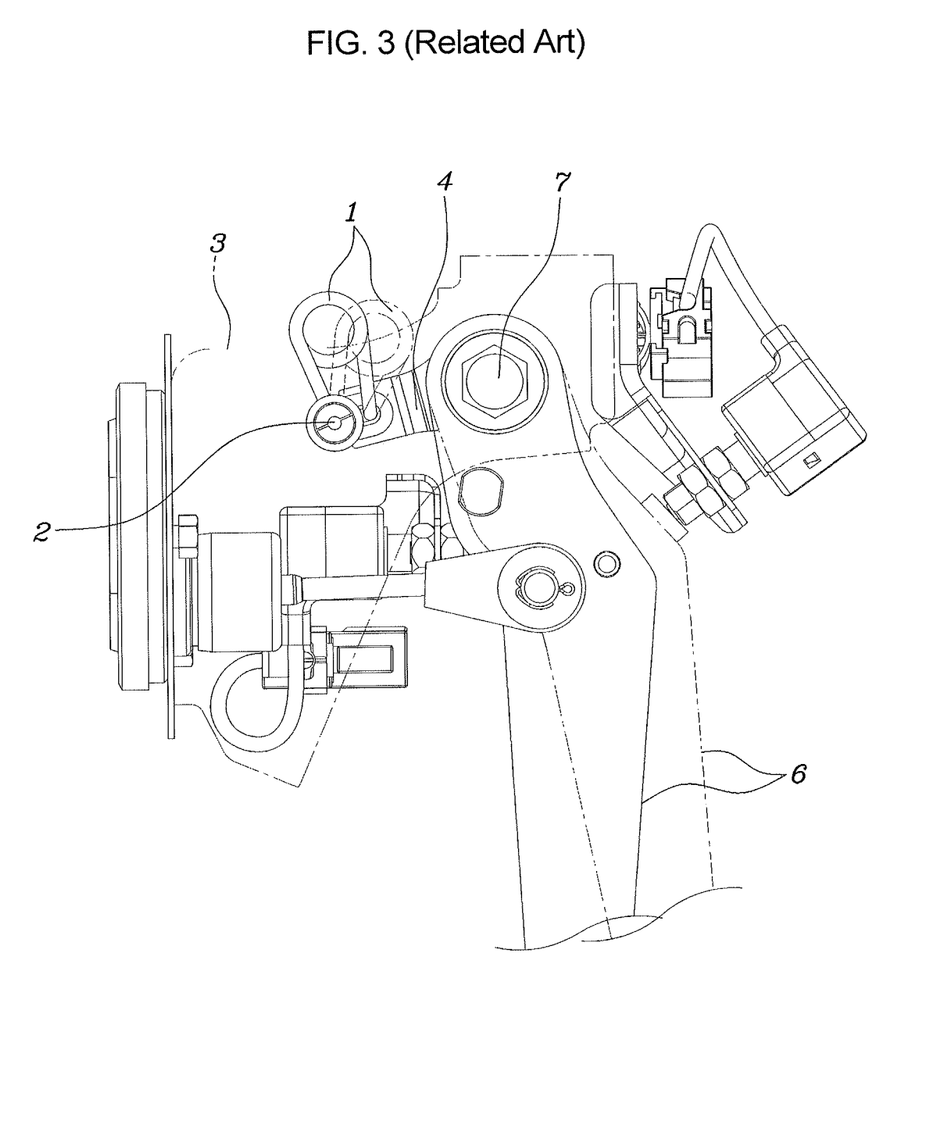

By this configuration, when the pedal 6 rotates (from a dotted line toward a solid line) based on the hinge shaft 7 as illustrated in FIG. 3 by an operation of a driver's foot, the turnover spring 1 is compressed. In this case, a compressive force is delivered to the pedal 6 and thus a reaction force is generated in the pedal 6 in an opposite direction of a load applied to the pedal 6. As a result, the load applied to the pedal 6 by the driver, that is, the pedal effort is gradually increased. In this case, the driver recognizes the reaction force delivered from the pedal 6 to check an operation state of the pedal 6.

Further, the reaction force of the turnover spring 1 is suddenly reduced at the moment that the turnover spring 1 is changed from a dotted line toward a solid line by the continued rotation of the pedal 6 as illustrated in FIG. 3 and the pedal effort of the driver applied to the pedal 6 is also reduced correspondingly, such that the driver has a reduced fatigue feeling due to the reduced pedal effort at the time of the operation of the pedal 6.

However, the structure to reduce the pedal effort of the clutch pedal using the turnover spring 1 as described above is used in the high horse power vehicle having the high engine output, and thus the damage of parts may often occur.

That is, when a clutch disc and the flywheel are connected to each other to deliver power, a sliding phenomenon need not occur between the clutch disc and the flywheel to be able to smoothly deliver the engine power.

Therefore, in the case of the high horse power vehicle having the high engine output, a spring force of a diaphragm needs to be higher than before to prevent the sliding phenomenon from occurring between the clutch disc and the flywheel. To this purpose, the existing structure using the turnover spring 1 has used a method for increasing a diameter of the turnover spring 1 to increase the spring force of the diaphragm.

However, when the diameter of the turnover spring 1 is increased, the load is concentrated on the spring bush 2 which connects the turnover spring 1 to the pedal member 3. As a result, the spring bush 2 may be often damaged and as the diameter of the turnover spring 1 is increased, an initial pedal effort is increased and thus the fatigue of the driver is increased.

The above information disclosed in this Background section is only for enhancement of understanding of the background of the invention and therefore it may contain information that does not form the prior art that is already known in this country to a person of ordinary skill in the art.

BRIEF SUMMARY

Various aspects of the present invention are directed to providing a pedal effort adjusting apparatus for vehicles capable of reducing a pedal effort which a driver feels during a clutch pedal operation and being used without a breakage and a damage of parts even in high horse power vehicles having a high engine output.

According to various aspects of the present invention, a pedal effort adjusting apparatus for vehicles may include a fixed part rotatably coupled with a pedal member, a moving part configured to linearly move with respect to the fixed part, an elastic member configured to support the fixed part and the moving part, and a lever protrusion coupled to a hinge shaft of a pedal and configured to rotate together with the pedal and have an end rotatably coupled to the moving part to linearly move the moving part at a time of the rotation of the pedal, in which the fixed part may be rotatably coupled to the pedal member so that a first arc having a radius of a distance from a rotating center of the lever protrusion to a coupled center between the lever protrusion and the moving part and a second arc having a radius of a distance from the coupled center between the lever protrusion and the moving part to a rotating center of the fixed part have an overlapping section.

The fixed part may have one end rotatably coupled to the pedal member and the moving part may be assembled with one end of the fixed part in an initial position state of the pedal and may be configured to compress the elastic member while moving toward another end of the fixed part as the lever protrusion rotates at the time of the rotation of the pedal.

The distance from the rotating center of the lever protrusion to the coupled center between the lever protrusion and the moving part may have a length of two times or longer than that of the distance from the coupled center between the lever protrusion and the moving part to the rotating center of the fixed part in an initial position state of the pedal.

The fixed part may be rotatably coupled to the pedal member so that the distance from the rotating center of the lever protrusion to the coupled center between the lever protrusion and the moving part may be formed to have any one of multiple values between 2.1 times or more and 3.5 times or less than that of the distance from the coupled center between the lever protrusion and the moving part to the rotating center of the fixed part, in an initial position state of the pedal.

An angle formed by the distance from the rotating center of the lever protrusion to the coupled center between the lever protrusion and the moving part and the distance from the coupled center between the lever protrusion and the moving part to the rotating center of the fixed part may have an angle of 90° or more in an initial position state of the pedal.

The fixed part may be rotatably coupled with the pedal member so that the angle formed by the distance from the rotating center of the lever protrusion to the coupled center between the lever protrusion and the moving part and the distance from the coupled center between the lever protrusion and the moving part to the rotating center of the fixed part may have an angle of 100° or more and less than 180°, in the initial position state of the pedal.

The elastic member may be configured to be compressed before the angle formed by the distance from the rotating center of the lever protrusion to the coupled center between the lever protrusion and the moving part and the distance from the coupled center between the lever protrusion and the moving part to the rotating center of the fixed part, depending on the rotation of the lever protrusion, exceeds 180° to apply a reaction force to the rotation of the lever protrusion and then the elastic member may be configured to be restored when the angle exceeds 180° to apply assist power to the rotation of the lever protrusion so as to perform a load switching.

The fixed part may be a housing having one end opened and provided with a cutting groove from the opened one end toward another end along a length of the fixed part.

The elastic member may be inserted into the fixed part, the moving part may be assembled inside the fixed part and have both ends inserted into the cutting groove, and an outside of the fixed part may be further provided with a pair of cover plates which surface-contact each other along an outer circumference of the fixed part and are each coupled to both ends of the moving part to guide a linear movement of the moving part.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 4:
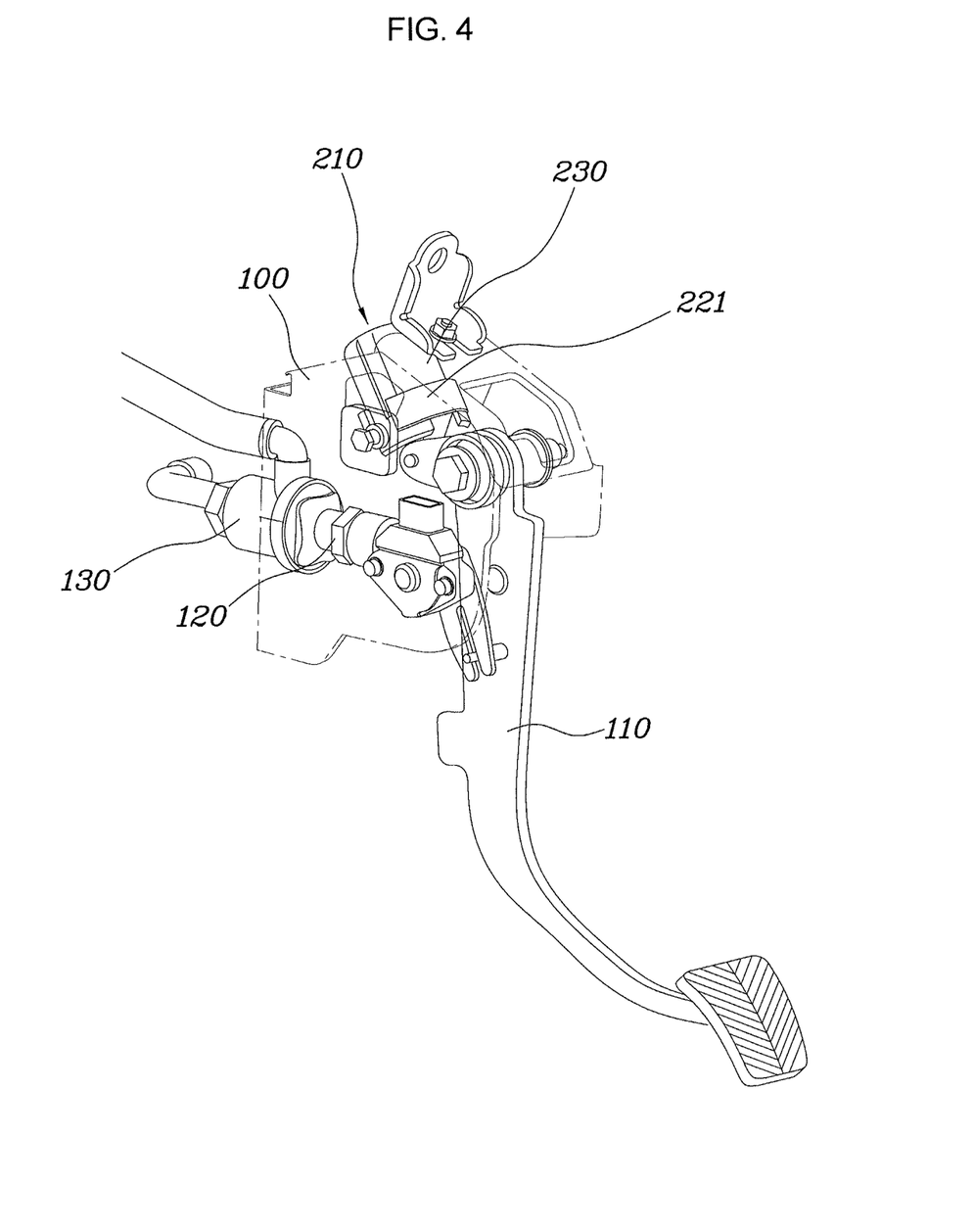
FIG. 4 and FIG. 5 are a perspective view and a side view of an exemplary pedal effort adjusting apparatus for vehicles according to the present invention.
Figure 5:
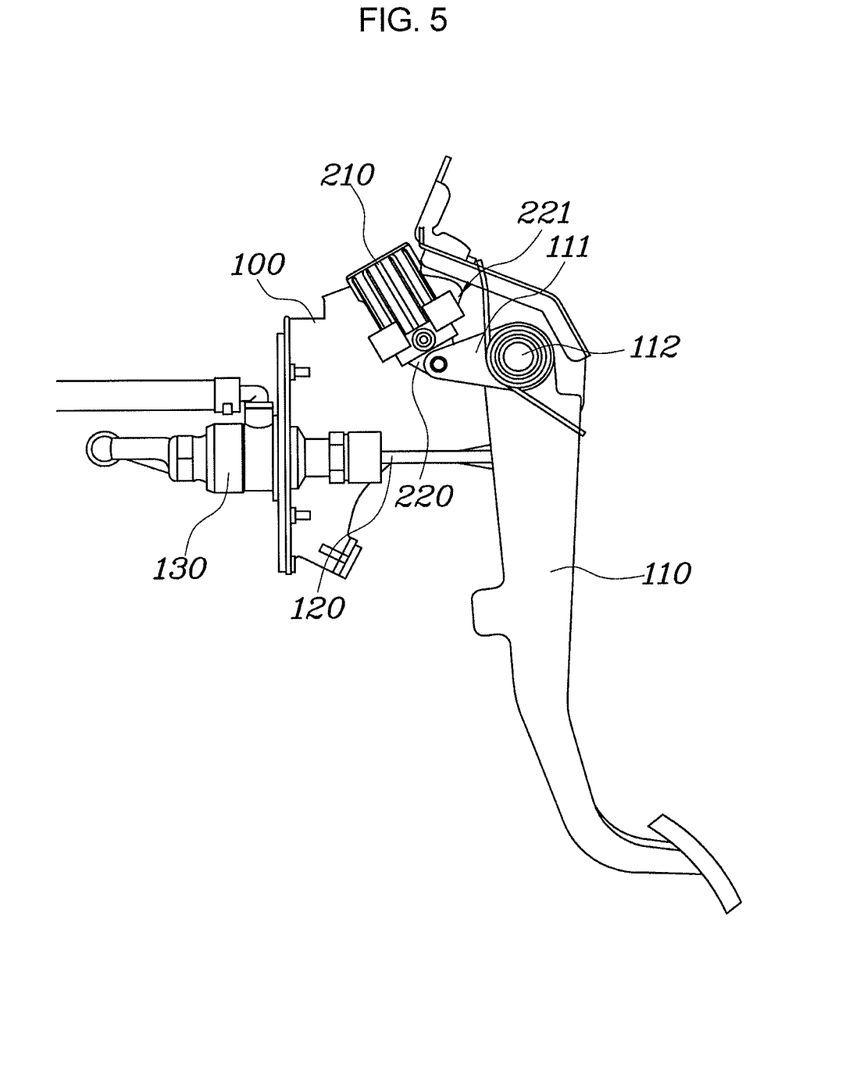

As illustrated in FIG. 4 and FIG. 5, a clutch pedal apparatus for vehicles includes a pedal member 100 configured to be fixedly installed at a vehicle body panel (dash panel) of a front side under a driver's seat, a pedal 110 having an upper end rotatably coupled with the pedal member 100 via a hinge shaft 112, and a master cylinder 130 configured to generate an oil pressure depending on an operation of a push rod 120 connected to the pedal 110.

Meanwhile, the pedal effort adjusting apparatus for vehicles according to various embodiments of the present invention includes a fixed part 210 configured to be rotatably coupled with the pedal member 100, a moving part 220 configured to linearly move with respect to the fixed part 210, an elastic member 230 configured to support the fixed part 210 and the moving part 220, and a lever protrusion 111 configured to be coupled with the hinge shaft 112 of the pedal 110 to rotate together with the pedal 110 and have an end rotatably coupled with the moving part 220 to linearly move the moving part 220 at the time of the rotation of the pedal 110.

Figure 9:
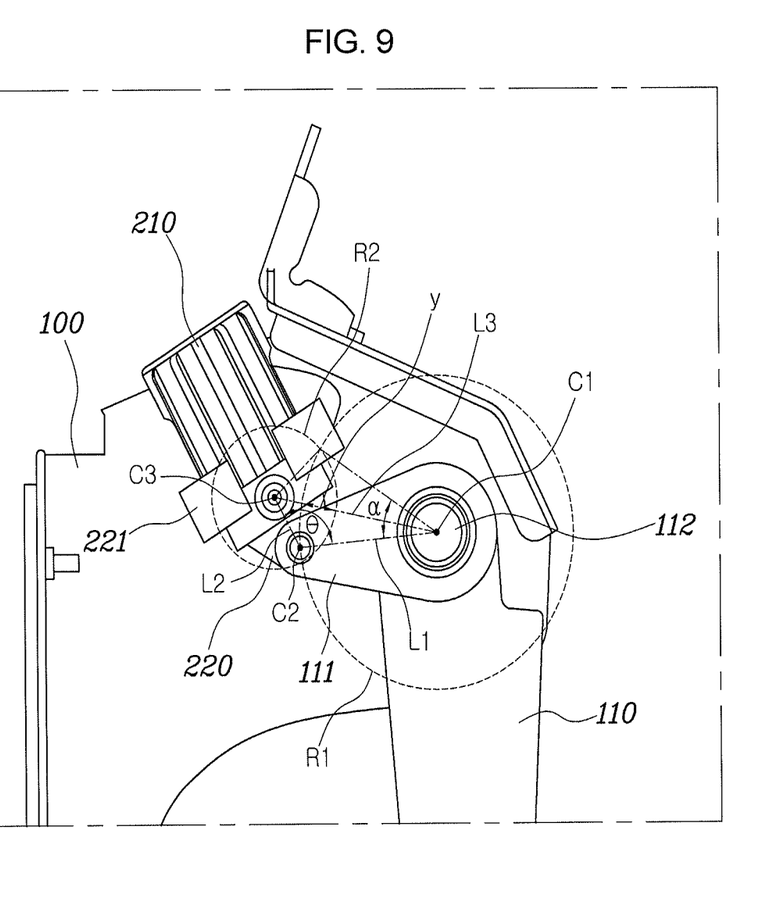
FIG. 9 is a diagram illustrating an angle setting state in an initial position state of a pedal according to the present invention.

Further, FIG. 9 is a diagram illustrating an angle setting state in an initial position state of the pedal according to various embodiments of the present invention, in which when a rotating center of the lever protrusion 111 is set to be C1, a coupled center between the lever protrusion 111 and the moving part 220 is set to be C2, a rotating center of the fixed part 210 is set to be C3, a distance from the C1 to the C2 is set to be L1, and a distance from the C2 to the C3 is set to be L2, the fixed part 210 may rotatably be coupled with the pedal member 100 so that a first arc R1 having the L1 as a radius based on the C1 and a second arc R2 having the L2 as a radius based on the C3 have an overlapping section y.

Here, the C1 may be a shaft center of the hinge shaft at which the lever protrusion 111 is coupled with the pedal 110, C2 may be a center of a hingedly coupled shaft between the lever protrusion 111 and the moving part 220, and C3 may be a center of a hingedly coupled shaft between the fixed part 210 and the pedal member 100.

Figure 6:
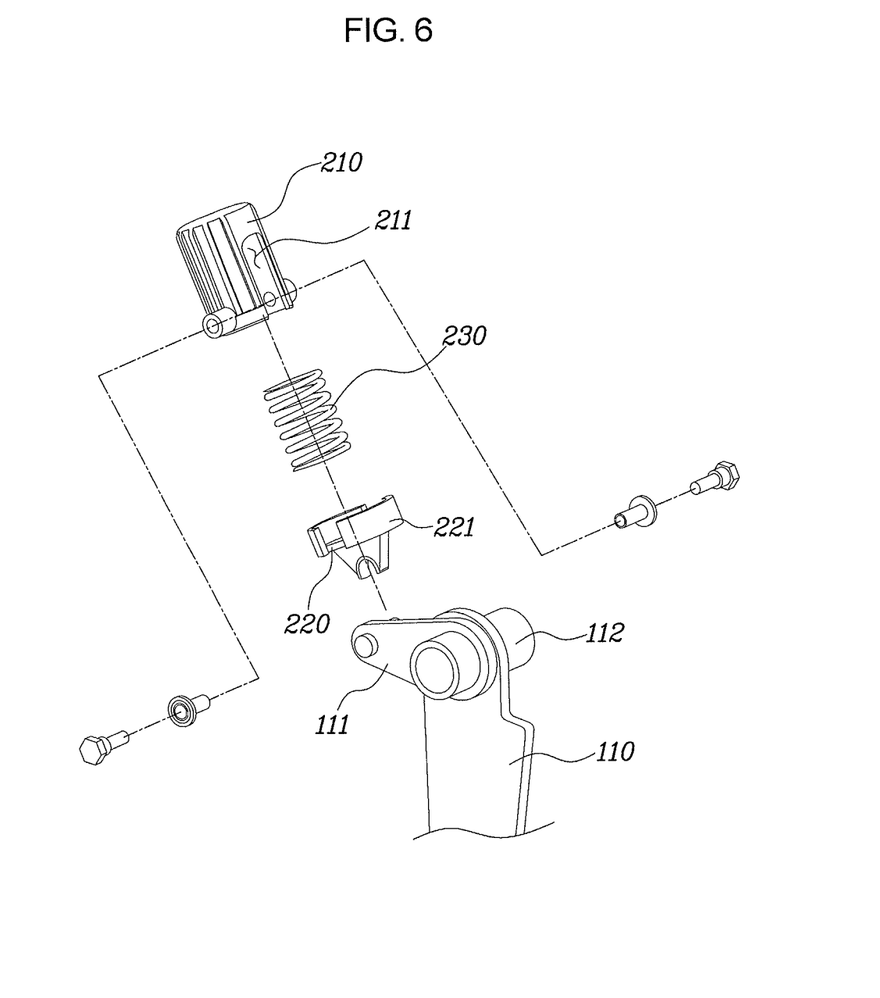
FIG. 6 and FIG. 7 are an exploded perspective view and an assembling view of the exemplary pedal effort adjusting apparatus for vehicles according to the present invention.
Figure 7:
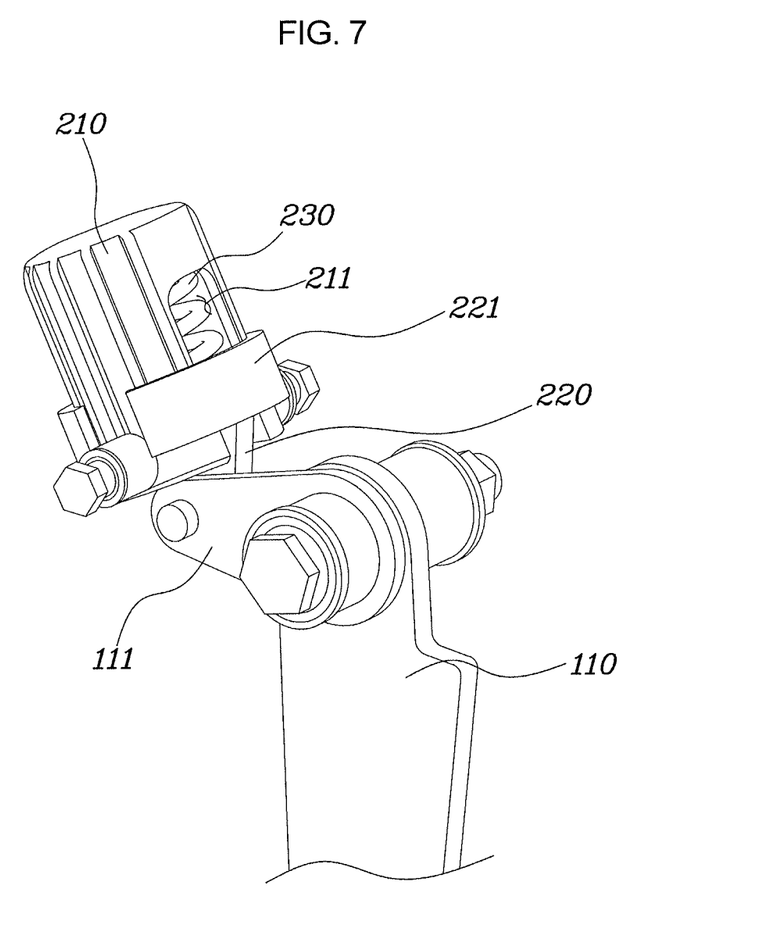

In more detail, FIG. 6 and FIG. 7 are an exploded perspective view and an assembling view of the pedal effort adjusting apparatus for vehicles according to various embodiments of the present invention, in which the fixed part 210 is a housing whose one end is opened and may be provided with a cutting groove 211 from the opened one end toward the other end along a length of the fixed part 210.

Further, the elastic member 230 is inserted into the fixed part 210, the moving part 220 is assembled inside the fixed part 210 and has both ends inserted into the cutting groove 211, and an outside of the fixed part 210 may be further provided with a pair of cover plates 221 which surface-contact each other along an outer circumference of the fixed part 210 and are each coupled with both ends of the moving part 220 to guide a linear movement of the moving part 220.

The moving part 220 may move along the length of the fixed part 210 in an internal space of the fixed part 210 and the cutting groove 211 may enable the moving part 220 to be slid along the length of the fixed part 210 while the moving part 220 is coupled with the cover plate 221.

Figure 8A:
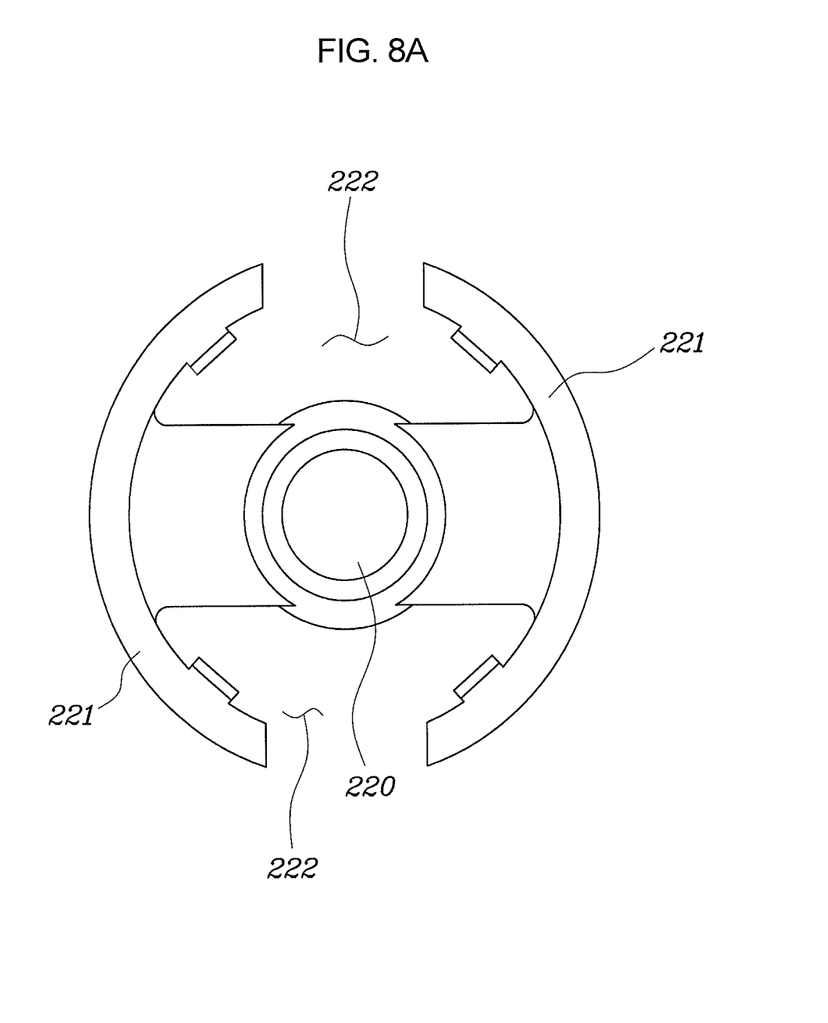
FIG. 8A is a top side view of a moving part of the exemplary pedal effort adjusting apparatus for vehicles according to the present invention.
Figure 8B:
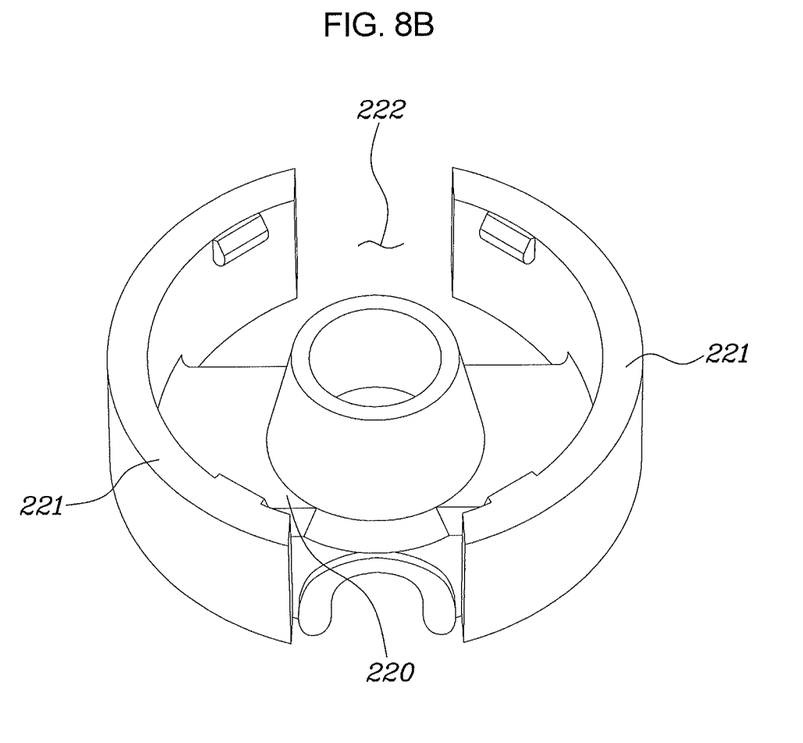
FIG. 8B is a perspective view of the moving part of the exemplary pedal effort adjusting apparatus for vehicles according to the present invention.

As illustrated in FIG. 8A and FIG. 8B, the pair of cover plates 221 may each be coupled with both ends of the moving part 220. Preferably, central portions of each cover plate 221 may be coupled with a corresponding end among both ends of the moving part 220. Therefore, the coupled position is not limited thereto and may be variously set. The cover plate 221 may be formed to match a shape of the outer circumferential surface of the fixed part 210 and is formed to make a surface facing the fixed part 210 surface-contact the outer circumferential surface of the fixed part 210 to stably support the movement of the moving part 220 when the moving part 220 is slid in a length direction of the fixed part 210. To this end, the cover plate 221 may form a predetermined width in the length direction of the fixed part 210.

Further, a gap 222 may be formed between the corresponding ends of the pair of cover plates 221. Here, the gap 222 is formed at a position corresponding to the coupled point between the fixed part 210 and the pedal member 100 and thus the cover plate 221 may be naturally slid without being locked to the coupled part between the fixed part 210 and the pedal member 100 even though the moving part 220 is slid. The gap 222 may be formed to be equal to or larger than the diameter of the coupled part between the fixed part 210 and the pedal member 100.

Meanwhile, as illustrated in FIG. 6, FIG. 7 and FIG. 9, the fixed part 210 has one end rotatably coupled with the pedal member 100, the moving part 220 is assembled with one end of the fixed part 210 in the initial position state of the pedal and may compress the elastic member 230 while moving toward the other end of the fixed part 210 as the lever protrusion 111 rotates at the time of the rotation of the pedal 110.

Here, the initial position state of the pedal 110 means a state in which the driver does not operate the pedal 110, that is, an initial state in which the pedal 110 is positioned by being pressed by the elastic force of the elastic member 230 or the diaphragm spring of the clutch in an un-load state of the pedal 110 in which the pedal 110 is not applied with any external force and thus the pedal 110 is not stepped on.

Therefore, the pedal 110 rotates by being stepped on, and at the same time the lever protrusion 111 rotates. As such, the rotation of the lever protrusion 111 slides the moving part 220 toward the other end of the fixed part 210 to compress the elastic member 230. Further, the fixed part 210 rotates by the rotation of the lever protrusion 111 and then the rotation of the lever protrusion 111 is turned in an extending direction, not in a compression direction of the elastic member 230 at one point. In this case, the elastic member 230 is elastically restored and extended to impart an elastic force to the lever protrusion 111 in the rotating direction of the lever protrusion 111. Therefore, the pedal 110 is applied with a pedal effort at an early stage. Then, at one point, a load switching applying assist power is generated in a direction in which the pedal 110 is stepped on and a fatigue of a driver is reduced when the clutch is operated.

Meanwhile, as illustrated in FIG. 9, the fixed part 210 has one end rotatably coupled with the pedal member 100 and the moving part 220 is assembled with one end of the fixed part 210 at the initial position state of the pedal to be able to increase the overlapping section y of the first arc R1 and the second arc R2. In other words, since the L2 is formed to be smaller than the L1 depending on the coupled position of the fixed part 210, the C3 may be positioned to be close to the first arc R1, such that the overlapping section y of the first arc R1 and the second arc R2 may be increased to be larger than the case in which the C3 is formed at the other end of the fixed part 210.

In this case, when a virtual line connecting between the C1 and the C3 is set to be L3, the overlapping section y may be a portion corresponding to the L3 in the space which is generated by the overlapping of the first arc R1 and the second arc R2. As the overlapping section y is increased, a maximum compression amount of the elastic member 230 depending on the rotation of the pedal 110, that is, a maximum displacement of the elastic member 230 is increased to be able to increase the size of the assist power applied to the pedal 110 when the elastic member 230 is restored.

Further, the displacement of the elastic member 230 may be increased to sufficiently increase the assist power even though a spring having a low spring constant as the elastic member 230 is used and the initial pedal effort may be reduced by using the spring having the low spring constant, such that the fatigue of the driver may be reduced. Further, as the spring constant is reduced, the elastic member 230 is easily compressed when the elastic member 230 and the moving part 220 are assembled, thereby improving the overall assembling performance.

Meanwhile, the L3 is positioned within a rotating angle range α of the lever protrusion 111 and the fixed part 210 may be coupled with the pedal member 100 so that the L1 is two times longer than the L2. More preferably, the length of the L1 may be formed to have any one of multiple values between 2.1 times or more and 3.5 times or less than that of the L2 in the initial position state of the pedal. When the length of the L1 has a multiple value of 2.1 times less than that of the L2, for example, when the length of the L1 has a multiple value of 1.5 times or 1.8 times, the load switching may not be made within the rotating angle range α of the lever protrusion 111.

In this case, the load applied to the pedal may be switched at a point where an angle θ formed by the L1 and the L2 depending on the rotation of the rotating protrusion is 180°, that is, based on when the L1 and the L2 are parallel with the L3. That is, when the driver starts to be stepped on the pedal 110 in the initial position state of the pedal 110 and thus the lever protrusion 111 rotates, the elastic member 230 is compressed before the angle θ formed by the L1 and the L2 depending on the rotation of the lever protrusion 111 exceeds 180° to apply a reaction force to the rotation of the lever protrusion 111 and then the elastic member 230 is restored when the angle θ exceeds 180° to apply the assist power to the rotation of the lever protrusion 111, thereby performing the load switching. Next, when the driver takes his/her foot off the pedal 110, the pedal 110 again returns to the initial position state by the restoring force of the diaphragm spring installed on the clutch disc.

When the length of the L1 has a multiple value of 2.1 times less than that of the L2, the L1 is positioned to deviate from or be approximately close to the rotating angle range α of the lever protrusion 111 at the initial position of the pedal and thus the driver is not likely to recognize the switching generation when the driver substantially steps on the pedal. On the other hand, when the length of the L1 is set to have a multiple value exceeding 3.5 times larger than the length of the L2, the length of the L2 is shorter and thus the overlapping section y of the first arc R1 and the second arc R2 is increased, such that the compression amount of the elastic member 230 may be more increased. However, the rotation amount of the fixed part 210 is increased in response to the rotation of the lever protrusion 111 and the length of the elastic member 230 and the fixed part 210 is also increased in response to the increase in the displacement of the elastic member 230, such that the fixed part 210 may collide with the pedal member 100, the push rod, or the like.

Therefore, the load switching is generated while the pedal 110 is stepped on and a length ratio of the L1 and the L2 may preferably be set in consideration of a layout of peripheral structures and the length of the L1 may be more preferably set to have a multiple value between 2.1 times or more and 3.5 times or less than that of the L2.

In adjusting the length ratio of the L1 and the L2, the ratio is preferably set by adjusting the L2 by adjusting the coupled position of the fixed part 210 and the pedal member 100 rather than adjusting the L1. Further, various embodiments of the present invention are not limited thereto and therefore the rate may also be set by adjusting the length of the lever protrusion 111. Here, various exemplary embodiments may be applied.

Meanwhile, the fixed part 210 may be coupled with the pedal member 100 so that the angle θ formed by the L1 and the L2 is preferably set to have an angle which is equal to or more than 90°, the angle θ formed by the L1 and the L2 is more preferably set to have any one of angles between 100° or more and less than 180°.

When the angle θ formed by the L1 and the L2 is less than 100°, the fixed part 210 may collide with the pedal member 100 or structures and apparatuses installed on the pedal member 100 in the initial position state of the pedal to cause the interference and when the angle θ formed by the L1 and the L2 is equal to or more than 180°, the load switching may not occur. Therefore, the angle θ formed by the L1 and the L2 may be set to form the initial angle between 100° and 180° in consideration of the interference with the pedal member 100 and the load switching.

The foregoing length ratio and angle setting of the L1 and the L2 preferably have the range of the value as described above, but are not necessarily limited to the above range. That is, to achieve the goal to set each range, each range may be a wider or narrower range depending on the layout and the installation relationship of the pedal member 100, the fixed part 210, the moving part 220, the elastic member 230, the lever protrusion 111, and the like.

According to the pedal effort adjusting apparatus for vehicles having the foregoing structure, it is possible to reduce the pedal effort of the clutch pedal by increasing the compressed amount of the spring and improve the assembling performance and reduce the initial pedal effort by lowering the spring constant.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention by defined by the Claims appended hereto and their equivalents.

What is claimed is:

1. A pedal effort adjusting apparatus for a vehicle, comprising:
    a fixed part rotatably coupled with a pedal member;
    a moving part configured to linearly move with respect to the fixed part;
    an elastic member configured to support the fixed part and the moving part; and
    a lever protrusion coupled to a hinge shaft of a pedal and configured to rotate together with the pedal and have an end rotatably coupled to the moving part to linearly move the moving part at a time of the rotation of the pedal,
    wherein the fixed part is rotatably coupled to the pedal member so that a first arc having a radius of a distance from a rotating center of the lever protrusion to a coupled center between the lever protrusion and the moving part and a second arc having a radius of a distance from the coupled center between the lever protrusion and the moving part to a rotating center of the fixed part have an overlapping section,
    wherein the fixed part is a housing having a first end opened and provided with a cutting groove from the opened first end toward a second end along a length of the fixed part, and
    wherein the elastic member is inserted into the fixed part, the moving part is assembled inside the fixed part and has both ends inserted into the cutting groove, and an upper part of the moving part is further provided with a pair of cover plates which surface-contact with an outside of the fixed part and are each coupled to both ends of the upper part of the moving part to guide a linear movement of the moving part.

2. The pedal effort adjusting apparatus for the vehicle of claim 1, wherein the fixed part has said first end rotatably coupled to the pedal member and the moving part is assembled with the first end of the fixed part in an initial position state of the pedal and is configured to compress the elastic member while moving toward said second end of the fixed part as the lever protrusion rotates at the time of the rotation of the pedal.

3. The pedal effort adjusting apparatus for the vehicle of claim 1, wherein the distance from the rotating center of the lever protrusion to the coupled center between the lever protrusion and the moving part has a length of two times or longer than that of the distance from the coupled center between the lever protrusion and the moving part to the rotating center of the fixed part in an initial position state of the pedal.

4. The pedal effort adjusting apparatus for the vehicle of claim 1, wherein the fixed part is rotatably coupled with the pedal member so that the distance from the rotating center of the lever protrusion to the coupled center between the lever protrusion and the moving part is formed to have one of multiple values between 2.1 times or more and 3.5 times or less than that of the distance from the coupled center between the lever protrusion and the moving part to the rotating center of the fixed part, in an initial position state of the pedal.

5. The pedal effort adjusting apparatus for the vehicle of claim 1, wherein an angle formed by the distance from the rotating center of the lever protrusion to the coupled center between the lever protrusion and the moving part and the distance from the coupled center between the lever protrusion and the moving part to the rotating center of the fixed part has an angle of 90° or more in an initial position state of the pedal.

6. The pedal effort adjusting apparatus for the vehicle of claim 5, wherein the fixed part is rotatably coupled with the pedal member so that the angle formed by the distance from the rotating center of the lever protrusion to the coupled center between the lever protrusion and the moving part and the distance from the coupled center between the lever protrusion and the moving part to the rotating center of the fixed part has an angle of 100° or more and less than 180°, in the initial position state of the pedal.

7. The pedal effort adjusting apparatus for the vehicle of claim 1, wherein the elastic member is configured to be compressed before the angle formed by the distance from the rotating center of the lever protrusion to the coupled center between the lever protrusion and the moving part and the distance from the coupled center between the lever protrusion and the moving part to the rotating center of the fixed part, depending on the rotation of the lever protrusion, exceeds 180° to apply a reaction force to the rotation of the lever protrusion and then the elastic member is configured to be restored when the angle exceeds 180° to apply assist power to the rotation of the lever protrusion so as to perform a load switching.

* * * * *